Patented Aug. 28, 1934

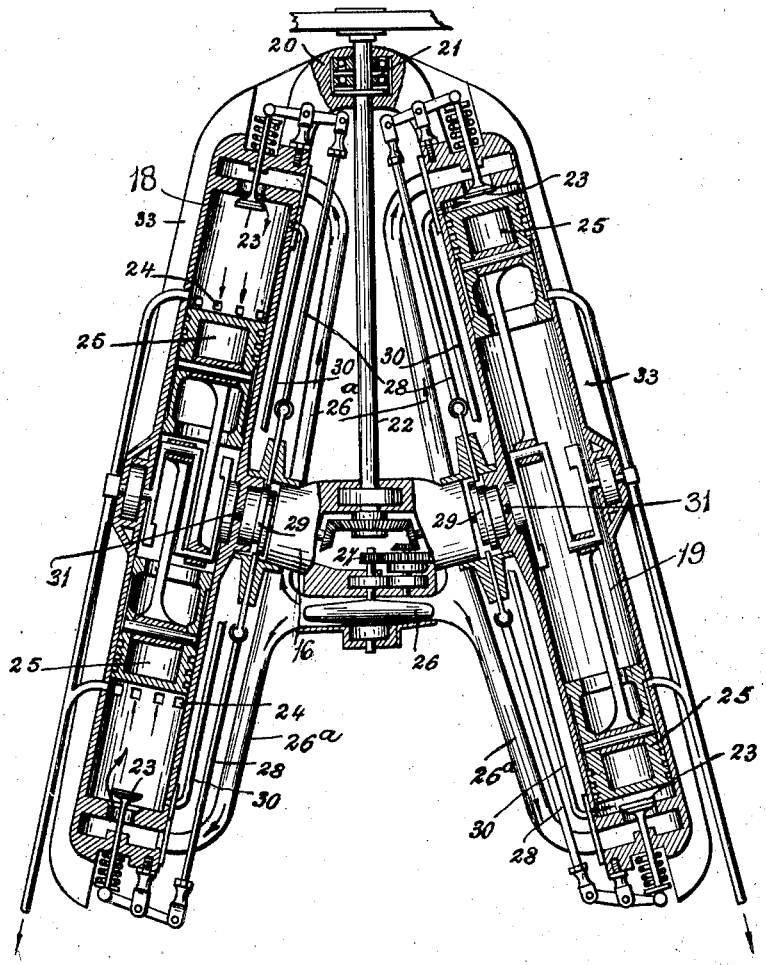

1,971,645

UNITED STATES PATENT OFFICE 1,971,645

ENGINE AND PROPELLER ARRANGEMENT CHIEFLY ADAPTED FOR AEROPLANES AND LIKE AIRCRAFT

Victor Ehmig, Paris, France

Application February 10, 1931, Serial No. 514,871
In France February 14, 1930

2 Claims. (Cl. 123—56)

The present invention relates to an engine of the explosion or internal combustion type particularly for use on aircraft, the object being to provide an engine of a shape which can readily be fitted to the extremity of a streamline body without adversely affecting the streamline, and which therefore gives the advantages incidental to good streamlining.

It is generally the practice at present in engines for aircraft to have the axes of the cylinders at right angles to the propeller shaft. Now, according to the present invention, an internal combustion engine, particularly for use on aircraft, is characterized by being of pointed shape, the axes of the cylinders being preferably arranged to converge towards the propeller shaft for the purpose of giving the pointed shape.

An engine of this type, when applied to the extremity or nose of a streamlined body such as the fuselage of a flying machine, gives a good aerodynamic profile at the nose of the fuselage, and a good propeller efficiency, and reduces the head resistance to motion.

Another advantage of this arrangement of the cylinders is to make it easy to fit the shape of the motor to that of the fuselage for every type of aircraft or to the profile of the wings in the case of aircraft having side engines, this, on the one hand, facilitating the construction of the aircraft, and, on the other, reducing the lines, improving the performance and avoiding the formation of whirls or eddies on the wings and fuselage which hinder the currents of air from flowing readily past the wings and cause vibrations of the wing assembly.

An engine according to the invention permits of a single and light reduction gear for the propeller shaft. The accompanying drawing shows, by way of example, a longitudinal section of a motor of the two-stroke internal combustion type arranged according to the present invention.

As shown, the engine cylinders 18, 19 are mounted on opposite sides of a central crankcase 16 and are connected at their front ends by a front support 20, in which is a thrust ballbearing 21 for the propeller shaft 22. At each end of each cylinder is an inlet valve 23. The exhaust takes place through ports 24 which are uncovered by pistons 25 when near the end of the expansion stroke at which instant the inlet valves open, and the burnt gas is expelled by the scavenging action of fresh compressed air supplied by a rotary compressor 26 and passing through the pipes 26A. Then, the pistons 25 reclose the ports 24 and begin compression of the fresh air, the explosion of the compressed air being produced by the direct injection of fuel into the combustion chambers in a known manner. Said compressor is driven by speed-increasing gearing 27 situated in the central crankcase.

The push-rods 28 connected with the inlet valves are driven by cams 29 mounted on crankshafts 31, and these shafts may also drive the fuel supply pumps, (not shown) on which are mounted injection pipes 30.

The different positions of the pistons shown correspond to the injection supply to cylinder 19 and to the scavenging of the cylinder 18.

An effective cooling is obtained by flanges or fins 33 which extend the whole length of the cylinders and are well exposed to the surrounding air, without any prejudicial resistance to the travel of the aeroplane, the cylinders being exposed to the passing air along their entire lengths and around nearly their entire circumferences.

The motor presents a pointed form and its diameter and profile can be adapted to the diameter of the fuselage and to the profile of the wings in order to obtain efficient application of the generated power, good visibility for the pilot, and an effective cooling of the cylinders, and also diminish frontal resistance and prevent the formation of eddies on the wings and on the fuselage.

I claim:

1. A motor for aircraft including a propeller shaft, a front support in which the forward portion of the shaft is journaled, a crank case in which the rear end of the propeller shaft is journaled, internal combustion engines secured upon the crank case at opposite sides of the propeller shaft and converging forwardly toward the shaft, the front ends of the engines being connected by the front support, gearing in the crank case whereby the propeller shaft will be driven by the engines, an air compressor carried by the crank case and connected with the engines to deliver air thereto, and gearing in the crank case whereby the air compressor will be driven by the engines.

2. An air-cooled motor for aircraft comprising a plurality of cylinders, a crank case connecting pairs of cylinders, a shaft having one end journaled within the crank case and carrying a propeller at its outer end, means connecting the forward ends of corresponding cylinders and journaling the outer end portion of the shaft, said pairs of cylinders converging toward the axis of the shaft in the form of a wedge, gearing carried in the crank case and connecting the inner end portion of the shaft with the shafts in the pairs of cylinders, and an air pump mounted integrally with the crank case.

VICTOR EHMIG.